United States Patent
Sato

(10) Patent No.: US 6,678,256 B1
(45) Date of Patent: Jan. 13, 2004

(54) ATM SWITCH AND CONTROL METHOD THEREOF

(75) Inventor: Hiroyuki Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,559

(22) Filed: Apr. 20, 2000

(30) Foreign Application Priority Data

Apr. 30, 1999 (JP) ............................................ 11-125231

(51) Int. Cl.$^7$ ................................................. H04B 7/00
(52) U.S. Cl. ................. 370/310.1; 370/338; 370/395.5; 370/331; 370/467
(58) Field of Search ................................. 370/351, 389, 370/395.1, 360, 310.1, 338, 395.5, 395.51, 395.52, 395.53, 395.54, 400, 401, 410, 466, 467, 328, 329, 331, 310.2

(56) References Cited

U.S. PATENT DOCUMENTS

| | | | | |
|---|---|---|---|---|
| 5,896,386 | A | * | 4/1999 | Johnston ...................... 370/466 |
| 5,907,542 | A | * | 5/1999 | Kuehnel et al. ............. 370/331 |
| 5,946,634 | A | * | 8/1999 | Korpela .................... 455/552.1 |
| 5,953,328 | A | * | 9/1999 | Kim et al. ................... 370/337 |
| 6,049,543 | A | * | 4/2000 | Sauer et al. ................. 370/335 |
| 6,052,371 | A | * | 4/2000 | Lemieux ...................... 370/338 |
| 6,240,078 | B1 | * | 5/2001 | Kuhnel et al. .............. 370/331 |
| 6,349,099 | B1 | * | 2/2002 | Larikka et al. ........... 370/395.1 |
| 6,418,126 | B1 | * | 7/2002 | Gilmurray et al. ....... 370/310.1 |
| 6,470,004 | B1 | * | 10/2002 | Murata ....................... 370/347 |
| 6,563,811 | B2 | * | 5/2003 | Hansen et al. .............. 370/338 |
| 6,577,607 | B1 | * | 6/2003 | Mitts et al. .............. 370/310.1 |

FOREIGN PATENT DOCUMENTS

| JP | 10-336205 | 12/1998 |
|---|---|---|
| JP | 11-55721 | 2/1999 |
| JP | 11-122247 | 4/1999 |

OTHER PUBLICATIONS

Leuca et al. (US PUB 2002/0041593) methods and systems for managing the routing of packets over a hybrid communication network.*

"Draft Baseline Text for Wireless ATM Capability Set 1 Specification", Dec. 19, 1998, *The ATM Forum Working Technical Committee*, Wireless ATM Working Group.

A. Acharya et al., "Mobility support of IP over wireless ATM", IEEE Communications Magazine, vol. 36, Issue 4, pp. 84–88, Apr. 1998.

S. Zhou et al., "A mobility enabled hybrid wireless network with standard ATM backbone switches: architecture implementation and performance", Wireless Communications and Networking Conference 1999, IEEE, vol. 1, pp. 388–392, Sep. 1999.

* cited by examiner

*Primary Examiner*—Ricky Ngo
*Assistant Examiner*—Yvonne Q. Ha
(74) *Attorney, Agent, or Firm*—Young & Thompson

(57) ABSTRACT

An ATM switch 11 is equipped with a location manager 100 or a location server 200, which realizes the mobility supporting function of a terminal station. The location manager 100 or the location server 200 is equipped with a switching control unit 130 for performing a routing control to take all of data inputted to the ATM switch 11 in, an APCP processing unit 110 for translating a signalling signal into an APCP message, a SIG+M processing unit 120 for terminating a signalling, translating the APCP message for a communication with an access point into a SIG+M signal, which is a signalling signal added with the mobility supporting function of the terminal station, and executing the SIG+M signal and an ATM cell header conversion unit 140 for converting an ATM cell header of the SIG+M signal on demand.

7 Claims, 4 Drawing Sheets

ATM SWITCH AND CONTROL METHOD THEREOF

CROSS REFERENCE TO RELATED APPLICATIONS

The present invention claims priority from Japanese Patent Application No. 11-125231 filed Apr. 30, 1999, the contents of which are incorporated herein by reference.

BACKGROUND OF THE INVENTION

1. Field of the Invention

The present invention relates to an asynchronous transfer mode (referred to as ATM, hereinafter) switch used in an ATM network system and, particularly, to an ATM switch for use in a wireless ATM (referred to as WATM, hereinafter) network system with which the mobility of terminal station is realized.

2. Description of the Related Art

As the technique for supporting a mobility of a terminal station in a WATM network system, (SIG+M), which is the existing signaling function (referred to as SIG, hereinafter) added with a mobility support function (referred to as M, hereinafter) of the terminal station, was discussed in "Wireless ATM Capability Set1 Specification-Draft BTD-WATM-01.10"; Dec. 19, 1998, Nashville, USA, ATM Forum. That is, in order to realize the WATM network system, it is necessary to construct an architecture of the end user mobility supporting ATM switch (referred to as EMAS, hereinafter) in which the signaling function (SIG+M) is applied to an SIG protocol of the existing ATM switch.

In a case where a usual ATM switch having no mobility supporting unction of a terminal station is connected to the EMAS, however, a signaling ignal (SIG signal) is terminated by the ATM switch. Therefore, a signaling ignal (SIG+M signal) having the terminal station mobility supporting function is also terminated by the ATM switch. That is, when both an EMAS and a usual ATM switch, which are multistage connected, exist in a WATM network, the SIG+M signal is terminated by the usual ATM switch. Therefore, it has been impossible to construct the WATM network in the network system including usual ATM switch.

SUMMARY OF THE INVENTION

An object of the present invention is to provide an ATM switch in concord with a WATM network by providing a location manager or a location server having a mobility supporting function of a terminal station on a usual ATM switch having no mobility supporting function of the terminal station and a control method of the same ATM switch.

In order to achieve the above object of the present invention, an ATM switch used to perform a switching of ATM cells on an ATM network system in transferring the ATM cells is featured by comprising switching control means for controlling routes for switching means for executing a switching of the ATM cells required to take all input data in and routes of ports from which the input data is output, access point control protocol (APCP) processing means for translating a content of a signaling processing in a call control means into a message according to an APCP, which is a communication protocol for performing a communication with an access point, SIG+M processing means for performing a signaling termination and for executing the APCP message by translating the APCP message into the SIG+M signal, which is a signaling signal added with a mobility supporting function of a terminal station, ATM cell header conversion means for converting an ATM cell header of the SIG+M signal into virtual path identifier/virtual channel identifier (VPI/VCI) used in a user cell, inserting an identifier indicating that the converted cell is the SIG+M into a payload and transferring it to the SIG+M processing means, the ATM cell header conversion means being adapted to restore the SIG+M message and transfer it to the SIG+M processing means when a cell of the SIG+M signal converted into the VPI/VCI of the user cell header is received, the SIG+M processing means being adapted to match, as an interface with respect to the call control means, the call control means with the SIG+M processing mean, a call control interface means for recognizing a special signaling message used in the mobility supporting function of a terminal station, performing a termination processing for the special signaling message and exchanging signals with the APCP processing means. The SIG+M processing means includes movement manager for managing a movement of a terminal station, security manager for performing required security control and service control means for performing required service control.

The switching control means, the APCP processing means, the SIG+M means and the ATM cell header conversion means are provided on the network side of the switch means.

The movement manager may include a corresponding table between a location area for performing a routing control during a paging or hand-off and access points stored in the ATM switch.

Further, in order to achieve the above object of the present invention, an ATM switch control method for controlling an ATM switch used in switching in transferring ATM cells on an ATM network system is featured by comprising, in an ATM cell transfer processing requested from a terminal station in an uplink direction, the steps of controlling switch means for switching ATM cells to determine a route for taking all input data in and to determine a route of an output port, converting an ATM cell header of a SIG+M signal into a VPI/VCI used in a user cell, performing a required security control and service control by recognizing a special signaling message used in a mobility supporting function of the terminal station by using the SIG+M signal converted into the VPI/VCI, performing a termination processing for the special signaling and managing a movement of the terminal station, performing, on demand, a communication with an access point by translating the signaling message into an APCP message, which is a communication protocol for communication with the access point, and using the translated APCP message, and performing an output route control of the SIG+M processed signaling message and the user cell to the network by the switch means, and, in an ATM cell transfer processing in a down-link to the terminal station, the steps of controlling switch means for switching ATM cells to determine a route for taking all input data in and to determine a route of an output port, restoring the SIG+M message of a cell by receiving the cell of the VPI/VCI converted SIG+M signal of the user cell header, performing a required security control and service control by recognizing the special signaling message used in the mobility supporting function of the terminal station by using the restored SIG+M signal, performing a termination processing for the special signaling and managing a movement of the terminal station, performing, on demand, a communication with an access point by translating the signaling message into an APCP message, which is a communication protocol for communication with the access point, and using the translated APCP message, and performing an output route control of the SIG+M processed signaling message and the user cell to the terminal station by the switch means.

In the case of the up-link ATM cell transfer processing requested by the terminal station, the step of converting the ATM cell header of the SIG+M signal into the VPI/VCI includes the step of inserting an identifier indicating that the converted cell is the SIG+M is inserted into a payload and, in the case of the down-link ATM transfer processing to the terminal station, the step of restoring the SIM+M message of a cell by receiving the cell of the SIG+M signal includes the steps of filtering the received ATM cell and restoring the SIM+M message on a basis of the identifier when the identifier inserted into a portion of the payload is detected.

Further, in order to achieve the above object of the present invention, a memory medium storing a switching control program for controlling an ATM switch used in the switching in transferring an ATM cell on an ATM network is featured by storing, in an ATM cell transfer processing requested from a terminal station in an up-link direction, the steps of controlling switch means for switching ATM cells to determine a route for taking all input data and to determine a route of an output port, converting an ATM cell header of a SIG+M signal into a VPI/VCI used in a user cell, performing a required security control and service control by recognizing a special signaling message used in a mobility supporting function of the terminal station by using the SIG+M signal converted into the VPI/VCI, performing a termination processing for the special signaling and managing a movement of the terminal station, performing, on demand, a communication with an access point by translating the signaling message into an APCP message, which is a communication protocol for communication with the access point, and using the translated APCP message, and performing an output routing control of the SIG+M processed signaling message and the user cell to the network by the switch means, and, in an ATM cell transfer processing in a down-link to the terminal station, the steps of controlling switch means for switching ATM cells to determine a route for taking all input data and to determine a routing of an output port, restoring the SIG+M message of a cell by receiving the cell of the VPI/VCI converted SIG+M signal of the user cell header, performing a required security control and service control by recognizing the special signaling message used in the mobility supporting function of the terminal station by using the restored SIG+M signal, performing a termination processing for the special signaling and managing a movement of the terminal station, performing, on demand, a communication with an access point by translating the signaling message into an APCP message, which is a communication protocol for communication with the access point, and using the translated APCP message, and performing an output route control of the SIG+M processed signaling message and the user cell to the terminal station by the switch means.

BRIEF DESCRIPTION OF THE DRAWINGS

Preferred embodiments of the present invention will be described with reference to the accompanying drawings, in which.

DETAILED DESCRIPTION OF THE PREFERRED EMBODIMENTS

In the present invention, an ATM switch, which stores access point (referred to as AP, hereinafter) for storing WATM radio frequency link in a WATM network, is provided with a location manager (referred to as LM, hereinafter) having a signaling function (SIG+M) supporting the mobility of a terminal station by a location registration/authentication processing and a hand-off processing. Further, the ATM switch provided in the WATM network, for connecting to other network or other sub-network, is provided with a location server (referred to as LS, hereinafter) having a location management/authentication processing function and a function for supporting the mobility of the terminal station having a home in its own network by a hand-off processing. Each location server is provided in every network or sub-network and is provided with a location register/authentication server (LR/AUS).

In the following description, the ATM switch, which is added with the mobility supporting function of terminal station by having the location manager, will be referred to as "end user mobility supporting ATM switch—edge (EMAS-E)" and the ATM switch, which is added with the mobility supporting function of the terminal station by having the location server, will be referred to as "end user mobility supporting ATM switch—network (EMAS-N)".

Figure 1:
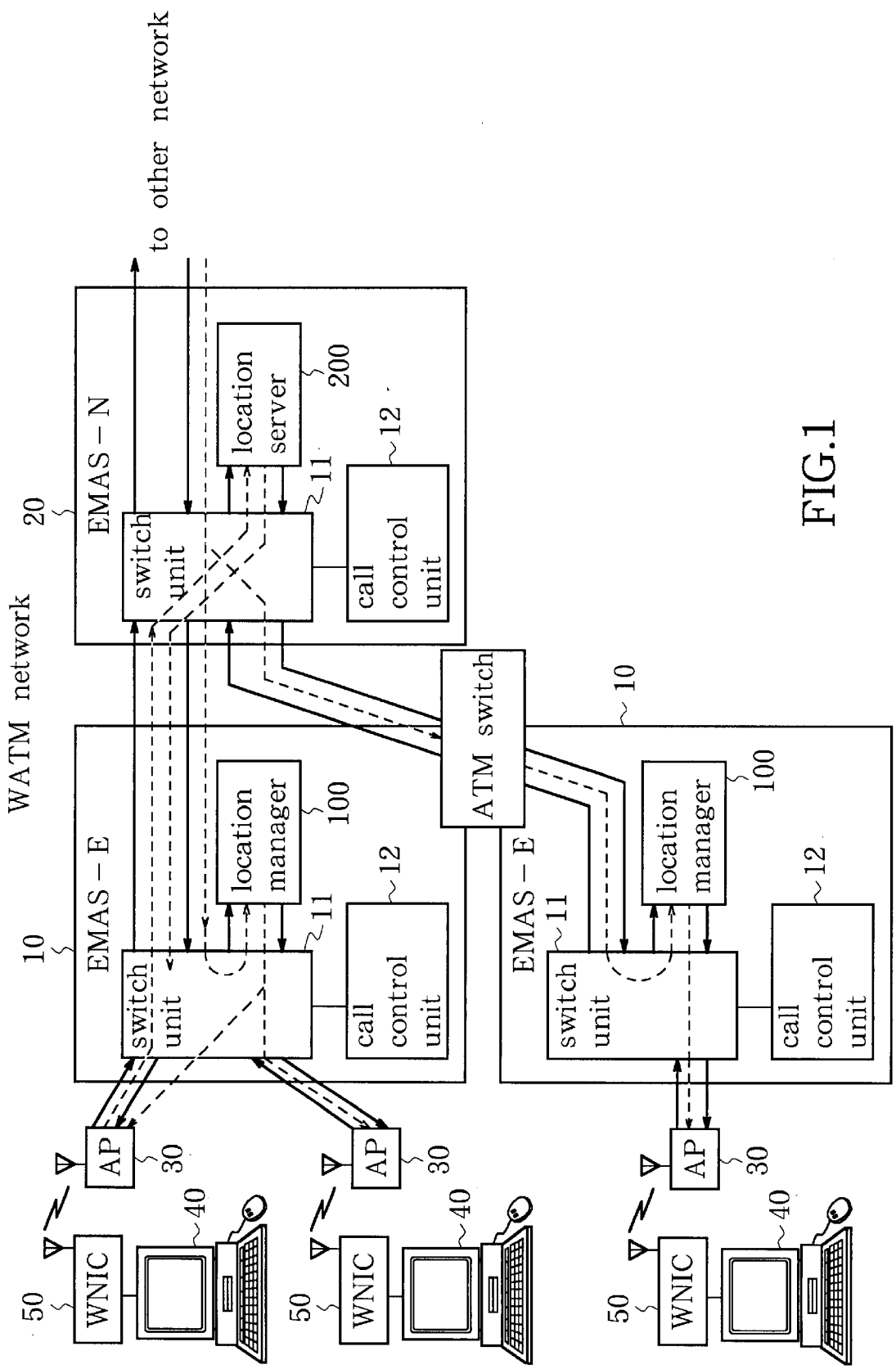
FIG. 1 is a block diagram showing a construction of a WATM network provided with an ATM switch according to a first embodiment of the present invention.

FIG. 1 is a block diagram showing a construction of a WATM network having an EMAS-E and an EMAS-N, which are the ATM switches according to an embodiment of the present invention. Referring to FIG. 1, each EMAS-E 10 accommodating a plurality of access points (AP's) 30 includes a switch unit 11 for executing a switching between ATM cells, a call control unit 12 which is used for establishing, maintaining, modifying and releasing a call and a connection but does not support mobility of terminal stations, and a location manager 100 for realizing the mobility supporting function of a terminal station by extending the SIG+M function. An EMAS-N 20 for connecting the EMAS-E's 10 to another network includes a switch unit 11 for executing a switching between the ATM cells, a call control unit 12 and a location server 200 for realizing the mobility supporting function of a terminal station by extending the SIG+M function.

As shown in FIG. 1, the location manager 100 of the EMAS-E 10 and the location server 200 of the EMAS-N 20 are arranged on the network sides of the switch units 11, respectively. Further, in the WATM network shown in FIG. 1, each mobile terminal (MT) 40 is connected to a corresponding access point 30 through a wireless network interface card (WNIC) 50. It should be noted that FIG. 1 shows only construction specific to this embodiment, without other general construction.

Figure 2:
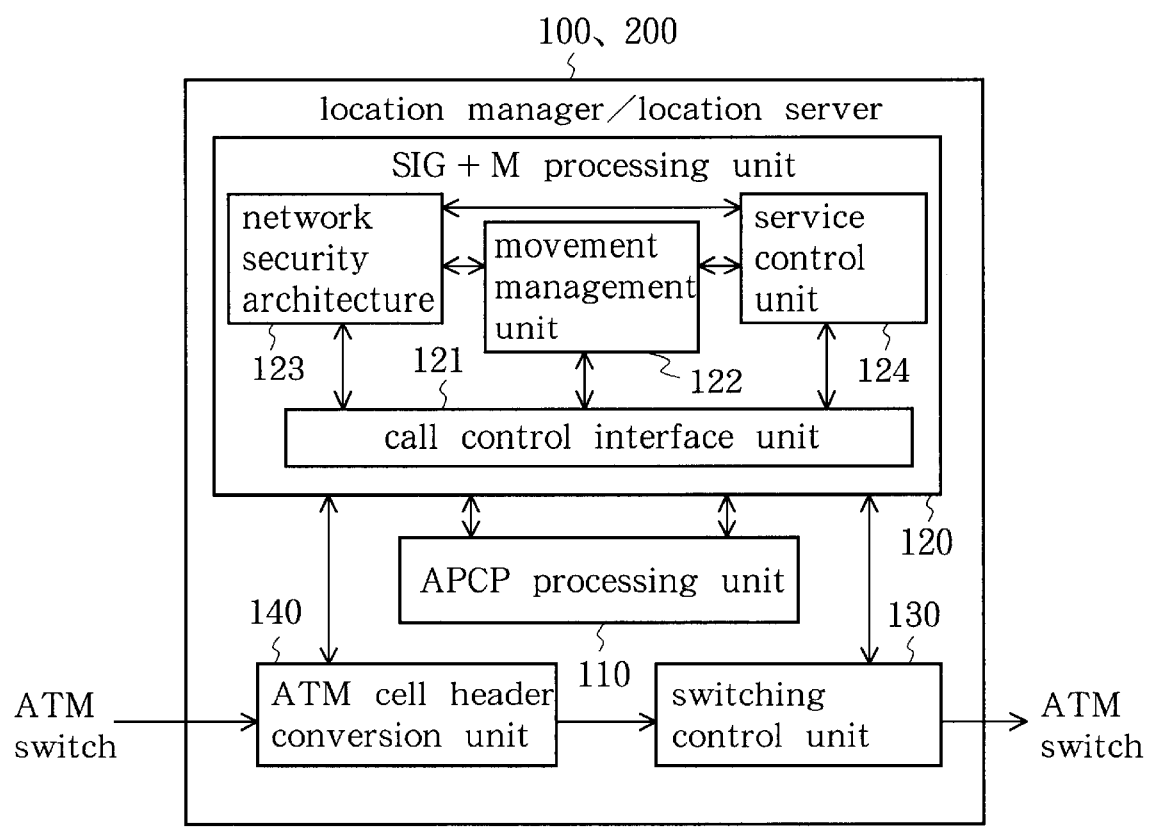
FIG. 2 is a block diagram showing a construction of a location manager and a location server to be mounted on the ATM switch shown in FIG. 1.

FIG. 2 is a block diagram showing a construction of the location manager 100 or the location server 200. It should be noted that the construction of the location manager 100 is identical to that of the location server 200.

Referring to FIG. 2, the location manger 100 or the location server 200 includes an APCP processing unit 110 for performing a communication with the access point 30, an SIG+M processing unit 120 for realizing the SIG+M function, a switching control (SW-CNT) unit 130 for performing a route control of the switch unit 11 and an ATM cell header conversion (HCV) 140 for performing a conversion processing of the ATM cell header. In a case where the EMAS-E 10 and the EMAS-N 20 are to be realized by data processing devices, that is, computers, the location manager 100 and the location server 200 are realized by program-controlled CPU's of the data processing devices, respectively. A computer program for controlling the CPU's is stored in a magnetic disk, an optical disk, a semiconductor memory or other general memory medium and loaded in an internal memory of the data processing unit to control the CPU's to thereby realize respective constructive components of the location manager 100 and the location server 200.

The APCP processing unit 110 performs the SIG+M termination processing in not the access point 30 but the location manager 100 of the EMAS-E 10. Therefore, it is mounted with the APCP for performing a communication between the access point 30 and the location manager 100. In order to use the APCP, a content of the signaling processing for performing a management, such as management of radio resources, of the access point 30 in the location manager 100 is translated into an APCP message. The SIG+M processing unit 120 performs the SIG+M termination processing and translates the APCP message for performing a communication with the access point 30 into a SIG+M signal and executes it. As shown in FIG. 2, the SIG+M processing unit 120 includes a call control interface unit (CC+M) 121, which is an interface between the call control portion 12 and the SIG+M processing unit 120, a mobility management function (F) unit 122 for managing a movement of the terminal station 40, a network security administration (NSA) unit 123 for performing a security management and a service control function (SCF) unit 124 for performing a predetermined service control. Incidentally, the location registration/authentication function and the hand-off function are realized by the SIG+M processing. The SIG+M protocol is based on the functional construction studied in the previously mentioned ATM Forum.

The call control interface unit 121 provides, as a logic interface, a matching between the call control unit 12 of the switch unit 11, which does not support the mobility of the terminal station 30, and the location manager 100 or the location server 200. Further, the call control interface unit 121 recognizes a specific signaling message used to support the mobility of the terminal station 40, terminates the signaling message and exchanges signals with the APCP processing unit 110. All communications between the APCP processing unit 110 and the SIG+M processing unit 120 are performed through the call control interface unit 121. The function of the call control interface unit 121 is not the function of the call control unit of the existing ATM switch extended to have a function of supporting the mobility of the terminal station, but a minimum control function required to perform the SIG+M signaling processing.

The mobility management function unit 122 manages the movement of the terminal station 40. The mobility management function unit 122 includes a correspondence table storing a relation between a location area for performing a routing control in a case of paging or hand-off and the access points 30 included in the switch unit 11.

The security management unit 123 performs a hiding control of an information such as verification for authentication of terminal station and message authentication.

The service control unit 124 manages service data and service profile.

The switching control unit 130 controls a routing within the switch unit 11 such that the signaling message input to the switch unit 11 is not terminated therein. That is, in order to prevent the signaling message from being terminated in the ATM switch of the location manager 100 or the location server 200 and to send/receive cells having cell headers converted into ATM cell headers, the switching control unit 124 performs a control of routing for taking in all data inputted to the switch unit 11. Further, in outputting the taken data to the location manager 100 or the location server 200, the switching control unit 124 controls a routing of the data within the switch unit 11 and to the output ports of the switch unit 11.

In a case where ATM switches, which have no mobility supporting function of terminal station, are connected in multi-stage manner between the EMAS-E 10 and the EMAS-N 20, which have the mobility supporting function, it is unnecessary to constitute all of the ATM switches with EMAS-E's each including the location manager 100 and EMAS-N's each including the location server 200 by performing the switching control such that the message is not SIG+M terminated. That is, it is enough to constitute the WATM network with the ATM switches, only the ATM switch including the access points and the ATM switch including the location registration server and the authentication server of which are constituted with the EMAS-E 10 and the EMAS-N 20, respectively.

By taking the case where ATM switches, which have no mobility supporting function of terminal station, are connected in multi-stage manner between the EMAS-E 10 and the EMAS-N 20, which have the mobility supporting function into consideration, the ATM cell header conversion unit 140 converts the ATM cell header of the SIG+M signal into the VPI/VCI used in the user cell such that all of the SIG+M signals exchanged between the EMAS-E 10 and the EMAS-N 20 are considered as user cells. Further, the identifier indicating that the converted cell is the SIG+M signal is inserted into the payload. That is, all of the data inputted to the switch unit 11 are filtered by the ATM cell header conversion unit 140. Further, when the ATM cell header conversion unit 140 receives a cell of the SIG+M signal whose header is converted into the VPI/VCI of the user cell header, the ATM cell header conversion unit 140 restores the SIG+M message of the cell and transfers the restored SIG+M message to the SIG+M processing unit 120.

Figure 3:
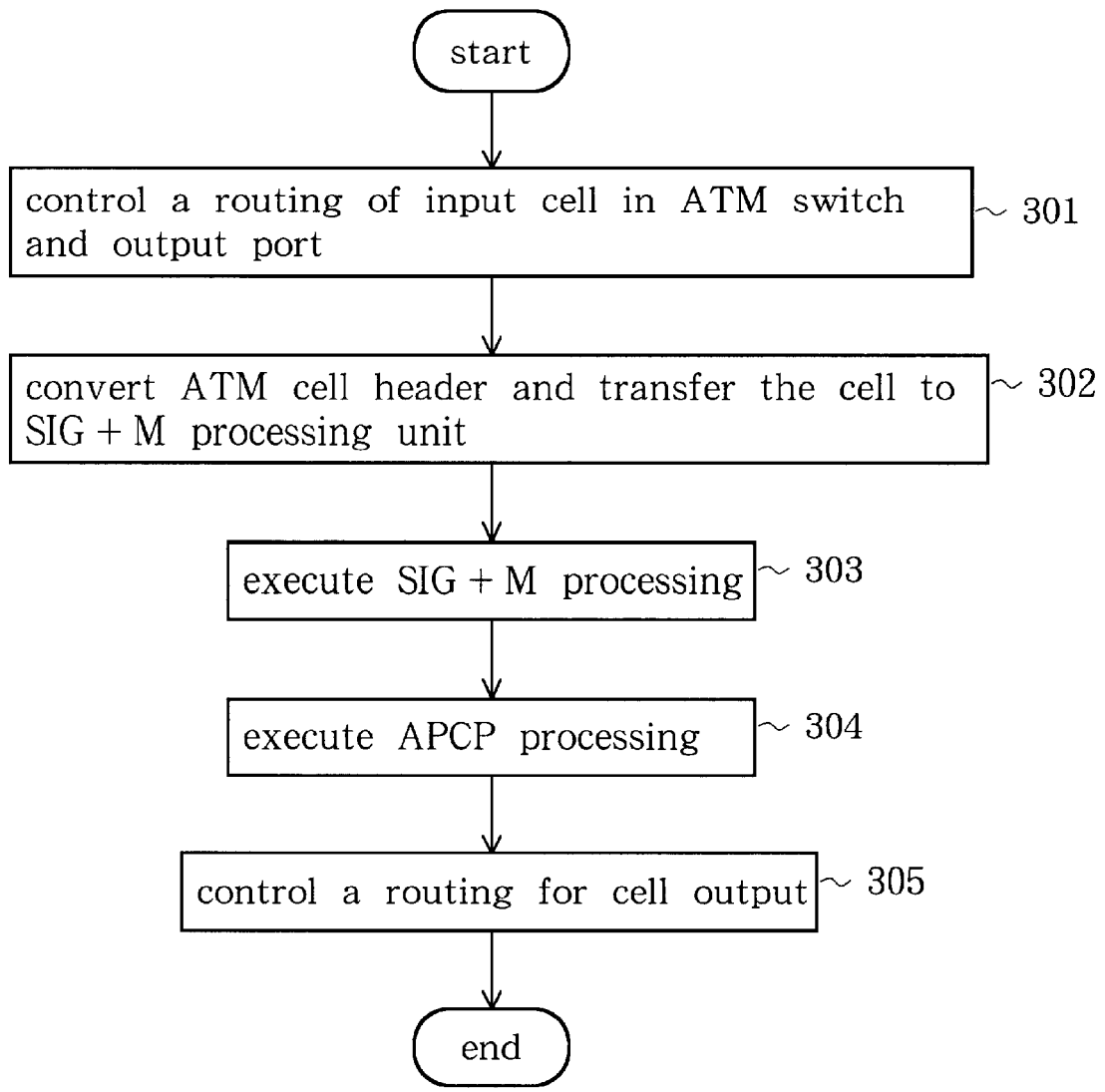
FIG. 3 is a flowchart showing a data transfer operation in an up-link direction.
Figure 4:
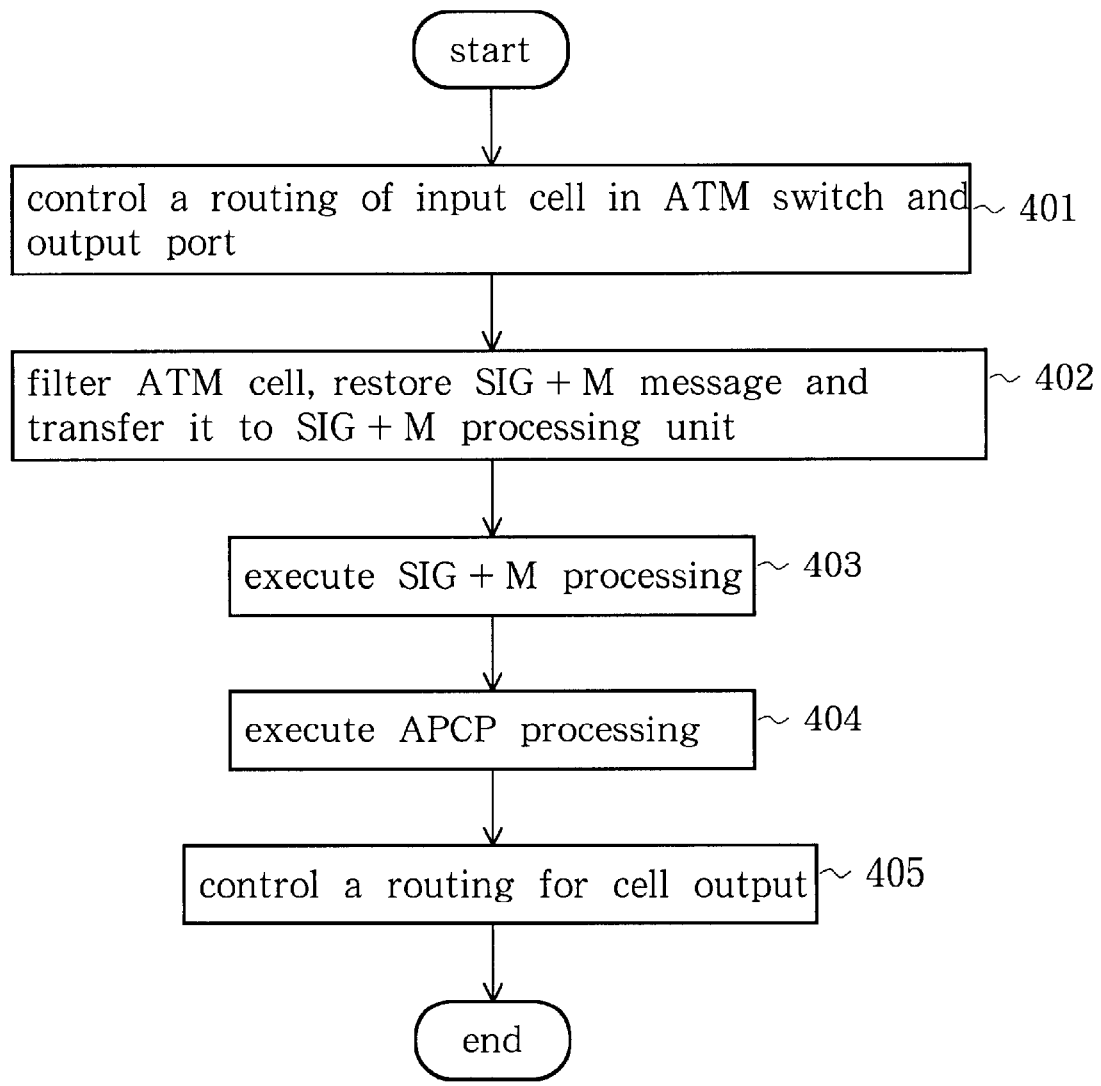
FIG. 4 is a flowchart showing a data transfer operation in a down-link direction.

An operation of this embodiment of the present invention will be described with reference to flowcharts shown in FIGS. 3 and 4, in which FIG. 3 is a flowchart showing an ATM cell transfer processing in an up-link direction in the EMAS-E 10, that is, in the direction from the terminal station 40 to the EMAS-E 10, and FIG. 4 is a flowchart showing an ATM cell transfer processing in a down-link direction in the EMAS-E 10, that is, the direction from the EMAS-E 10 to the terminal station 40.

Describing the up-link ATM cell transfer processing with reference to FIG. 3, the switching control unit 130 of the location manager 100 extracts a connection control information, which is processed by the call control interface unit 121, from an ATM cell received from the terminal station 40 through the wireless network interface card 50 and the access point 30, performs the switching control of the ATM switch by referencing the extracted connection control information and performs the routing control such that the ATM cell outputted by the EMAS-E 10 is outputted to the port for the location manager 100 under the switching control of the ATM switch (step 301).

Upon the reception of the ATM cell, the location manager 100 extracts the SIG+M message from the ATM cell by the ATM cell header conversion unit 140 and converts the SIG+M signal into an ATM cell header having the VPI/VCI value, which is not terminated by the switch unit 11, by the ATM cell header conversion unit 140, inserts the identifier indicating that the converted cell is the SIG+M into the payload and transfers it to the SIG+M processing unit 120 (step 302).

Then, in the SIG+M processing unit 120, a PDU is transmitted/received by the call control interface unit 121 as an interface for a lower layer to perform a communication with other function entities (122~124) belonging to the SIG+M processing unit 120 according to the processing content of the respective SIG+M messages, performs the termination processing of a specific signaling by recognizing the specific signaling message used in the mobility supporting function of the terminal station, manages the movement of the terminal station and executes a required processing such as security control or service control (step 303).

In regard to the SIG+M processing related to the management of the access point 30, such as security and release of wireless resources, etc., the SIG+M message is translated into the APCP message and the APCP message is transferred to the APCP processing unit 110 (step 304).

Finally, the signaling message and the user cell, which are SIG+M processed, are sent to the switch unit 11 and the routing control is performed by the call control interface unit 121 and the switching control unit 130 such that the signaling message and the user cell are outputted to the network side by the switch unit 11 (step 305).

The above mentioned operation is the operation of the location manager 100 mounted on the EMAS-E 10 in the case where the ATM cell is transferred from the terminal station 40 to the EMAS-E 10 and further transferred from the EMAS-E 10 to the EMAS-N 20. It should be noted that the operation of the location server 200 when the ATM cell is transferred from the EMAS-E 10 to the EMAS-N 20 and further transferred from the EMAS-N 20 to other network is the same as that of the operation of the location manager 100.

Now, the ATM cell transfer processing in the down-link direction will be described with reference to FIG. 4. First, the switching control unit 130 of the location manager 100 extracts the connection control information to be processed by the call control interface unit 121 from the ATM cell received from the EMAS-N 20 and performs a switching control of the switch unit 11 by referencing the extracted connection control information to control the routing such that the ATM cell outputted from the EMAS-E 10 is outputted to the port corresponding to the location manager 100 (step 401).

Upon the reception of the ATM cell, the location manager 100 filters the ATM cell by the ATM cell header conversion unit 140, restores the SIG+M message on the basis of the identifier inserted into a portion of the payload and transfers it to the SIG+M processing unit 120 (step 402).

Then, in the SIG+M processing unit 120, the call control interface unit 121 becomes an interface for the lower layers and transmits/receive the PDU to perform a communication with other function entities (122~124) belonging to the SIG+M processing unit 120 according to the processing content of the respective SIG+M messages to thereby execute the respective processing (step 403).

In regard to the SIG+M processing related to the management of the access point 30, such as security and release of wireless resources, etc., the SIG+M message is translated into the APCP message and the APCP message is transferred to the APCP processing unit 110 (step 404).

Finally, the signaling message and the user cell, which are SIG+M processed, are sent to the switch unit 11 and the routing control is performed by the call control interface unit 121 and the switching control unit 130 such that the signaling message and the user cell are outputted to the network side by the switch unit 11 (step 405).

The above mentioned operation is the operation of the location manager 100 mounted on the EMAS-E 10 in the case where the ATM cell is transferred from the EMAS-N 20 to the EMAS-E 10 and further transferred from the EMAS-E 10 to the terminal station 40. It should be noted that the operation of the location server 200 of the EMAS-N 20 when the ATM cell is transferred from other network to the EMAS-N 20 and further transferred to the EMAS-E 10 is the same as that of the operation of the location manager 100.

The operations mentioned above are also applied to the routing during the hand-off and the SIG+M processing in the location registration processing.

Although the present invention has been described with reference to the preferred embodiments, the present invention is not always limited to these embodiments. For example, in order to provide the mobility supporting function of the terminal station, which is necessary to construct the WATM network, the location manager or the location server may be provided not on the network side of the ATM switch but on the terminal station side of the ATM switch. In such case, however, it is necessary to add a specific operation such as insertion of a buffer, etc., to the routing control in the ATM switch.

As described hereinbefore, according to the ATM switch and the control method thereof and the recording medium storing the switching control program of the present invention, it becomes possible to easily make the ATM switch having no mobility supporting function adaptable to the WATM network by providing the location manager or the location server having the mobility supporting function on the ATM switch.

Further, since, in order to construct the WATM network in a case where ATM switches, which have no mobility supporting function of terminal station, are connected in multi-stage manner between the EMAS-E 10 and the EMAS-N 20, which have the mobility supporting function, it is necessary to provide the location managers or the location servers on not all of the ATM switches but only ATM switch including the access points and ATM including the location registration sever or the authentication server, it is easily possible to construct the WATM network by executing an extension of the function of the ATM switch.

The processing load to be carried on the access points is reduced by assigning the wireless resources by the APCP processing unit of the location manager or the location server without performing the signalling processing in the access points and, further, since the user network interface (UNI) signalling message is not used, it becomes possible to use same access points for various networks including such as WATM network, the existing ATM network and IP network, etc., the extendibility is improved.

What is claimed is:

1. An ATM switch used to perform a switching of ATM cells on an ATM network system in transferring the ATM cells, comprising:

switch means for switching a transfer route of a cell on the ATM network system;

switching control means for controlling a routing in said switch means for executing a switching of the ATM cells required to take all input data in and a routing to one of ports from which the input data is output;

call control means for establishing a connection in the ATM network;

APCP processing means for translating a content of a signalling processing in said call control means into an APCP message according to an access point control protocol, which is a communication protocol for performing a communication with access points;

SIG+M processing means for performing a signalling termination and for translating the APCP message into a SIG+M signalling signal by adding the mobility supporting function of terminal station thereto and executing the SIG+M signalling signal;

ATM cell header conversion means for converting an ATM cell header of the SIG+M signal into VPI/VCI used in a user cell, inserting an identifier indicating that the converted cell is the SIG+M into a payload and transferring it to said SIG+M processing means, said ATM cell header conversion means being adapted to restore the SIG+M message and transfer it to said SIG+M processing means when a cell of the SIG+M signal converted into the VPI/VCI of the user cell header is received;

said SIG+M processing means comprising call control interface means for matching between said call control means and said SIG+M processing means, for recognizing a special signaling message used in the mobility supporting function of a terminal station, performing a termination processing for the special signaling message and exchanging signals with said APCP processing means.

2. An ATM switch as claimed in claim 1, wherein said switching control means, said APCP processing means, said SIG+M means and said ATM cell header conversion means are provided on the network side of said switch means.

3. An ATM switch as claimed in claim 1, wherein said movement management means includes a correspondence table between a location area for performing a routing control during a paging or hand-off and access points stored in the ATM switch.

4. An ATM switch control method for controlling an ATM switch used in switching in transferring ATM cells on an ATM network system, comprising, in an ATM cell transfer processing requested from a terminal station in an up-link direction, the steps of:

controlling switch means for switching ATM cells to determine a route for taking all input data and to determine a route of an output port;

converting an ATM cell header of a SIG+M signal into a VPI/VCI used in a user cell;

performing a required security control and service control by recognizing a special signaling message used in a mobility supporting function of the terminal station by using the SIG+M signal converted into the VPI/VCI, performing a termination processing for the special signaling and managing a movement of the terminal station, performing, on demand, a communication with an access point by translating the signaling message into an APCP message, which is a communication protocol for communication with the access point, and using the translated APCP message, and performing an output route control of the SIG+M processed signaling message and the user cell to the network by the switch means, and comprising, in an ATM cell transfer processing in a down-link to the terminal station, the steps of:

controlling switch means for switching ATM cells to determine a route for taking all input data and to determine a route of an output port;

restoring the SIG+M message of a cell by receiving the cell of the VPI/VCI converted SIG+M signal of the user cell header;

performing a required security control and service control by recognizing the special signaling message used in the mobility supporting function of the terminal station by using the restored SIG+M signal;

performing a termination processing for the special signaling and managing a movement of the terminal station;

performing, on demand, a communication with an access point by translating the signaling message into an APCP message, which is a communication protocol for communication with the access point, and using the translated APCP message; and performing an output routing control of the SIG+M processed signaling message and the user cell to the terminal station by the switch means.

5. An ATM switch control method as claimed in claim 4, wherein the step of converting an ATM cell header of a SIG+M signal into a VPI/VCI in the case of the up-link ATM cell transfer processing requested by the terminal station, comprises the step of inserting an identifier indicating that the converted cell is the SIG+M into a payload and the step of restoring the SIG+M message of a cell by receiving the cell of the VPI/VCI converted SIG+M signal in the case of the down-link ATM transfer processing to the terminal station, comprising step of filtering the received ATM cell and, when the identifier inserted into a portion of the payload is detected, restoring the SIM+M message of the cell on a basis of the identifier.

6. A memory medium storing a switching control program for controlling an ATM switch used in the switching in transferring an ATM cell on an ATM network, said switching control program comprising, in an ATM cell transfer processing requested from a terminal station in an up-link direction, the steps of:

controlling a routing of switch means for executing the switching of the ATM cells to take all input data inputted thereto and of a port to output the input data;

converting an ATM cell header of a SIG+M signal into a VPI/VCI used in a user cell;

performing a required security control and service control by recognizing a special signalling message used in a mobility supporting function of the terminal station by using the SIG+M signal converted into the VPI/VCI, performing a termination processing for the special signalling and managing a movement of the terminal station;

performing, on demand, a communication with an access point by translating the signaling message into an APCP message, which is a communication protocol for communication with the access point, and using the translated APCP message; and performing an output routing control of the SIG+M processed signalling message and the user cell to said network by said switch means, and, in an ATM cell transfer processing in a down-link to the terminal station, the steps of:

controlling a routing of said switch means for switching ATM cells to take all input data inputted thereto and of a port to output the input data;

restoring the SIG+M message of a cell by receiving the cell of the VPI/VCI converted SIG+M signal of the user cell header;

performing a required security control and service control by recognizing the special signalling message used in the mobility supporting function of the terminal station by using the restored SIG+M signal, performing a termination processing for the special signaling and managing a movement of the terminal station;

performing, on demand, a communication with an access point by translating the signalling message into an APCP message, which is a communication protocol for communication with the access point, and using the translated APCP message; and performing an output routing control of the SIG+M processed signalling message and the user cell to the terminal station by said switch means.

7. A recording medium as claimed in claim 6, wherein the step of converting an ATM cell header of a SIG+M signal into a VPI/VCI in the case of the up-link ATM cell transfer processing requested by the terminal station, comprises the step of inserting an identifier indicating that the converted cell is the SIG+M into a payload and the step of restoring the SIG+M message of a cell by receiving the cell of the VPI/VCI converted SIG+M signal in the case of the down-link ATM transfer processing to the terminal station, comprises step of filtering the received ATM cell and, when the identifier inserted into a portion of the payload is detected, restoring the SIM+M message of the cell on a basis of the identifier.

* * * * *